(12) United States Patent
Snoeren et al.

(10) Patent No.: US 8,138,481 B2
(45) Date of Patent: Mar. 20, 2012

(54) DETERMINATION OF A SPATIAL GAIN DISTRIBUTION OF A SCINTILLATOR

(75) Inventors: Rudolph Maria Snoeren, Veldhoven (NL); Heidrun Steinhauser, Eindhoven (NL); Nicolaas Jan Noordhoek, Breda (NL); Matthias Simon, Aachen (DE)

(73) Assignee: Koninklijke Philips Electronics NV, Eindhoven (NL)

( * ) Notice: Subject to any disclaimer, the term of this patent is extended or adjusted under 35 U.S.C. 154(b) by 0 days.

(21) Appl. No.: 12/594,959

(22) PCT Filed: Apr. 9, 2008

(86) PCT No.: PCT/IB2008/051339
§ 371 (c)(1),
(2), (4) Date: Oct. 7, 2009

(87) PCT Pub. No.: WO2008/126012
PCT Pub. Date: Oct. 23, 2008

(65) Prior Publication Data
US 2010/0051816 A1 Mar. 4, 2010

(30) Foreign Application Priority Data
Apr. 12, 2007 (EP) ..................... 07106048

(51) Int. Cl.
*G01T 1/10* (2006.01)
(52) U.S. Cl. ....................... 250/362
(58) Field of Classification Search ............... 250/362, 250/370.01–370.15, 369; 378/98.8
See application file for complete search history.

(56) References Cited

U.S. PATENT DOCUMENTS

| | | | |
|---|---|---|---|
| 4,980,553 A * | 12/1990 | Henry | 250/369 |
| 5,025,462 A | 6/1991 | Saito et al. | |
| 5,905,772 A * | 5/1999 | Rutten et al. | 378/98.8 |
| 6,086,252 A | 7/2000 | Quadflieg et al. | |
| 6,600,159 B2 * | 7/2003 | Overdick et al. | 250/370.11 |
| 6,885,725 B2 | 4/2005 | Suzuki | |
| 7,732,778 B2 * | 6/2010 | Yokoyama et al. | 250/370.08 |
| 2003/0142792 A1 * | 7/2003 | Schmidt et al. | 378/207 |
| 2003/0210763 A1 * | 11/2003 | Polichar et al. | 378/98.3 |
| 2007/0034806 A1 * | 2/2007 | Hornig | 250/370.08 |
| 2009/0294679 A1 * | 12/2009 | Yagi et al. | 250/370.09 |

FOREIGN PATENT DOCUMENTS

| | | |
|---|---|---|
| DE | 19914217 A1 | 10/2000 |
| DE | 10247985 A1 | 4/2004 |
| EP | 0642264 A1 | 3/1995 |
| WO | 2006064403 A2 | 6/2006 |

* cited by examiner

*Primary Examiner* — Kiho Kim (57) ABSTRACT

A method for providing information about a spatial gain distribution of a scintillator for a primary radiation is provided which does not require the irradiation of the scintillator with the primary radiation. The method comprises the step of irradiating the scintillator with a secondary radiation for generating an image of a spatial secondary gain distribution of the scintillator for said second radiation. The spatial secondary gain distribution image corresponds to an image of the spatial primary gain distribution for the primary radiation. In an embodiment of the invention, i.e. in an X-ray imaging device where the primary radiation is X-ray radiation, the invention provides for an accurate calibration of the X-ray detector without irradiating the X-ray detector with X-ray radiation. Rather, irradiation with UV radiation as the secondary radiation provides the desired spatial secondary gain distribution image which can be used for calibration.

5 Claims, 5 Drawing Sheets

DETERMINATION OF A SPATIAL GAIN DISTRIBUTION OF A SCINTILLATOR

FIELD OF THE INVENTION

The invention relates to the field of radiation detectors, and more specifically to a radiation detector which comprises a scintillator.

BACKGROUND OF THE INVENTION

EP 0 642 264 A1 discloses an image detection device having a semiconductor image detection array for detecting X-ray images wherein perturbations due to phantom images are substantially mitigated. According to this reference, delayed charge transfer due to trapping of charges in the semiconductor material of radiation sensor elements causes such perturbations. The detection device according to the reference comprises an image detection array which incorporates radiation sensitive elements to convert incident radiation into charges, and read-out-lines to transfer the charges to a read-out circuit which is arranged to convert transferred charges into a primary electronic image signal. The detection device further comprises a correction circuit to form an image correction signal for converting the primary electronic image signal into a corrected image signal by removing artifacts due to delayed charge transfer from the primary electronic image signal. The image correction signal may be assembled as superposition of exponentially decaying signals of images which were detected before the detection of a currently detected image. A corrected image signal is subsequently assembled from the image correction signal and the image signal containing artefacts.

SUMMARY OF THE INVENTION

An object of the present invention is to provide information about a spatial gain distribution of a scintillator for a primary radiation. An advantage of the invention is that information about a spatial gain distribution of a scintillator for primary radiation is provided without the necessity to apply primary radiation to the scintillator.

Further, it would be advantageous to achieve a method or a radiation detector device for providing information about a spatial gain distribution of a scintillator without the necessity to apply primary radiation to the scintillator.

To better address this concern, in a first aspect of the invention a method for providing information about a spatial gain distribution of a scintillator for a primary radiation is presented. The method according to a first aspect of the invention comprises the step of irradiating the scintillator with a secondary radiation for generating an image of a spatial secondary gain distribution of the scintillator for the secondary radiation, wherein the spatial secondary gain distribution image corresponds to an image of the spatial primary gain distribution of the scintillator for the primary radiation. In this description and in the claims the term "image of a spatial secondary gain distribution of the scintillator for the secondary radiation" is abbreviated by "spatial secondary gain distribution image". In the same way, the term "image of a spatial primary gain distribution of the scintillator for the primary radiation" is abbreviated by "spatial primary gain distribution image".

According to a second aspect of the invention, a radiation detector device is presented which comprises a scintillator for receiving a primary radiation and producing in response hereto a converted primary radiation. The radiation detector device further comprises a secondary radiation source for applying to the scintillator a secondary radiation for generating an image of a spatial secondary gain distribution of the scintillator for the secondary radiation, wherein the spatial secondary gain distribution image corresponds to a spatial primary gain distribution image of the scintillator for the primary radiation.

According to an embodiment of the invention, a method is presented which further comprises the step of reading the secondary spatial gain distribution image from the scintillator.

According to still another embodiment of the invention, a corresponding radiation detector is provided comprising a read-out unit for reading the secondary spatial gain distribution image from the scintillator.

According to still another embodiment of the invention a method is presented, which further comprises the step of reading the spatial secondary gain distribution image from the scintillator by the same photo detector which is provided for reading a converted primary radiation generated by the scintillator in response to incident primary radiation. An advantage of this embodiment is that no additional photo detector for reading the spatial secondary gain distribution image is required. A further advantage of this embodiment is that from the scintillator on, the light path of the light of the spatial secondary gain distribution image is the same as the light path of the converted primary radiation.

According to another embodiment of the invention, a corresponding radiation detector device is presented, which further comprises a photo detector for reading a converted primary radiation generated by the scintillator in response to incident primary radiation, wherein the photo detector is provided also for reading the spatial secondary gain distribution image from the scintillator.

According to still another embodiment of the invention, a method is presented which comprises the step of irradiating the scintillator with the secondary radiation in a reference scintillator state for generating a reference image of secondary gain distribution. Herein, a reference scintillator state may be a state of a uniform gain distribution. Further, a reference scintillator state may be a state of a gain distribution which satisfies a certain condition, e.g. the gain contrast of which is below a predetermined level. Thereafter, the scintillator is irradiated with the secondary radiation in an actual scintillator state for generating an actual image of secondary gain distribution. Thereafter, a true actual image of spatial secondary gain distribution is generated from the reference spatial secondary gain distribution image and the actual spatial secondary gain distribution image. This embodiment has the advantage that the influence of a non-uniform secondary irradiation will be removed by the two-stage calibration with the reference spatial secondary gain distribution image and an actual spatial secondary gain distribution image.

According to still another embodiment of the invention, a corresponding radiation detector device is presented comprising a control unit for controlling the secondary radiation source in order to irradiate the scintillator with the secondary radiation in a reference scintillator state for generating a reference image of secondary gain distribution; a storage device for storing the spatial secondary gain distribution reference image; and controlling the secondary radiation source in order to irradiate the scintillator with the secondary radiation in an actual scintillator state for generating an actual image of secondary gain distribution. The radiation detector device of this embodiment further comprises a processing unit for generating true actual image of spatial secondary gain distribution from the reference spatial secondary gain distribution image and the actual spatial secondary gain distribution image.

According to still another embodiment of the invention, a method is presented according to which the primary radiation is irradiated onto a first surface portion of the scintillator and the secondary radiation is irradiated onto a second surface portion of the scintillator, the second surface portion of the scintillator being different from the first surface portion of the scintillator. This embodiment has the advantage that the light path for the primary radiation can be completely separated from the light path for the secondary radiation. This makes possible the use of materials, which are non-transparent for the primary radiation, in the light path for the secondary radiation. According to still another embodiment of the invention, the first surface portion of the scintillator may be opposite to the second surface portion of the scintillator. This allows for a homogeneous illumination of the scintillator with respect to the illumination with the primary radiation.

A corresponding embodiment of a radiation detector device comprises a first radiation path for the primary radiation and a second radiation path for the secondary radiation wherein the first radiation path and the second radiation path respectively end on different surface portions of the scintillator.

According to still another embodiment of the invention, a method is presented, wherein the primary radiation and the secondary radiation are irradiated onto a common surface portion of the scintillator. This has the advantage that the scintillator can be provided on a substrate that is not suitable for through-irradiation of primary irradiation and secondary radiation.

A corresponding embodiment of a radiation detector device comprises a first radiation path for the primary radiation and a second radiation path for the secondary radiation wherein the first radiation path and the second radiation path both end on the same surface portion of the scintillator.

According to still another embodiment of the invention, the primary radiation is X-ray radiation and the secondary radiation is non-X-ray radiation, e.g. ultraviolet (UV) radiation. This embodiment has the advantage that information about a spatial gain distribution of a scintillator for X-ray radiation can be obtained without using X-ray radiation, i.e. without exposure of personnel and/or patients with X-ray radiation.

According to still another embodiment of the invention, a method of imaging is presented comprises the steps: 1. Providing a radiation detector device having a photo detector and a scintillator, the scintillator generating a converted primary radiation in response to an primary radiation incident on the scintillator and the photo detector detecting the converted primary radiation. 2. Performing a method according to the invention or a method according to one or more embodiments of the invention with the scintillator of the radiation detector device to thereby generate the spatial secondary gain distribution image of the scintillator. 3. Acquiring a primary radiation image with the radiation detector device by receiving primary radiation with the scintillator. 4. Generating a corrected primary radiation image in response to the acquired primary radiation image and the spatial secondary gain distribution image. "Generating a corrected primary radiation image in response to the acquired primary radiation image and the spatial secondary gain distribution image" may comprise of or may consist of "calibrating the acquired primary radiation image with the spatial secondary gain distribution image". When employing in a method of imaging the method of providing information about a spatial gain distribution of a scintillator for a primary radiation according to the invention or a method containing the features of one or more embodiments of the invention, advantageously an information about a spatial gain distribution of the scintillator for a primary radiation can be obtained without the need of an irradiation of the scintillator with the primary radiation. Thereby a calibration of the scintillator can be performed in a safe way, i.e. without exposure of personnel and/or patients with primary radiation.

A device corresponding to the aforementioned method of imaging is an image detection device comprising a radiation detector device according to the invention or a radiation detector device according to an embodiment of the invention.

According to still another embodiment of the invention, a computer program product is presented enabling a processor to carry out the method of providing a spatial gain distribution of a scintillator for a primary radiation according to the invention or according to an embodiment of the invention. According to still another embodiment of the invention, a computer program product is presented enabling a processor to carry out the method of imaging according to the respective embodiment of the invention. The advantage of these embodiments of the invention is that a control unit for controlling the irradiation of the scintillator with he primary radiation or the secondary radiation does not have to be exchanged, but can be reprogrammed by the respective computer program product. The computer program product according to the respective embodiment of the invention may be provided in any suitable form, e.g. in the form of a new computer program, or in the form of an update of an existing computer program, via a respective medium, e.g. on a removable medium, over the internet, etc.

In summary, according to one aspect of the invention, a method and apparatus for providing information about a spatial gain distribution of a scintillator for a primary radiation is provided which does not require the irradiation of the scintillator with the primary radiation. The method comprises the step of irradiating the scintillator with a secondary radiation for generating an image of a spatial secondary gain distribution of the scintillator for the second radiation. The spatial secondary gain distribution image corresponds to an image of the spatial primary gain distribution for the primary radiation. In an embodiment of the invention, i.e. in an X-ray imaging device where the primary radiation is X-ray radiation, the invention provides for an accurate calibration of the X-ray detector without irradiating the X-ray detector with X-ray radiation. Rather, irradiation with UV radiation as the secondary radiation provides the desired spatial secondary gain distribution image which can be used for calibration.

These and other aspects of the invention will be apparent from and elucidated with reference to the embodiments described hereinafter.

BRIEF DESCRIPTION OF THE DRAWINGS

In the following detailed description, reference is made to the drawings in which.

DETAILED DESCRIPTION OF EMBODIMENTS

With reference to the drawings, illustrative embodiments of the present invention will now be described in more detail. Throughout the detailed description of the embodiments, an exemplary example for the primary radiation is X-ray radiation and an example for the secondary radiation non-X-ray radiation, and in particular, UV radiation or blue light.

Figure 1:
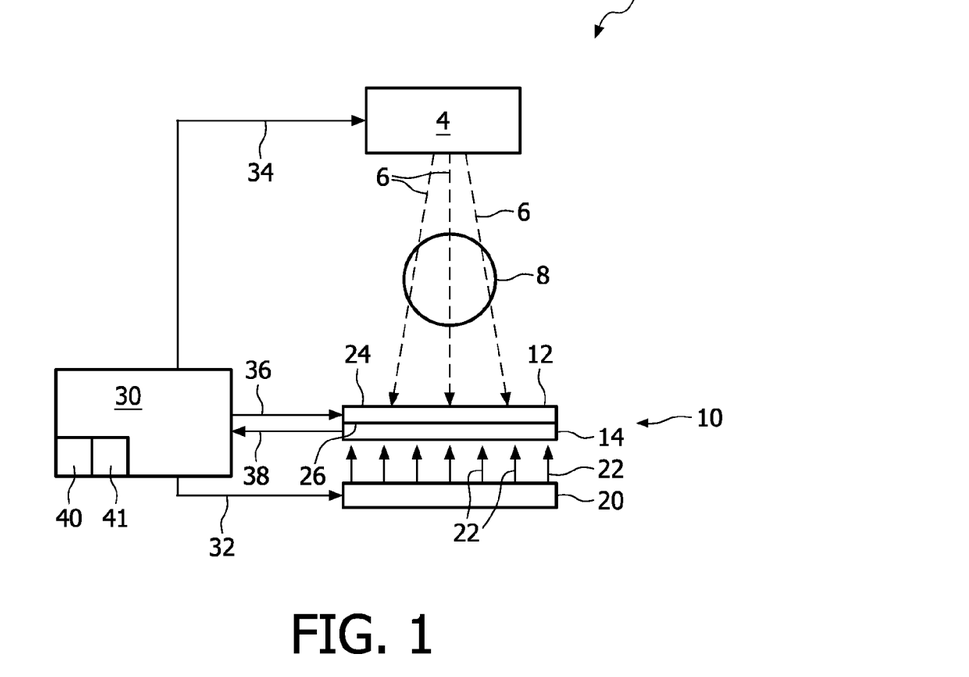
FIG. 1 shows a schematic view of an embodiment of an imaging apparatus according to the invention.

FIG. 1 shows a schematic view of an exemplary embodiment of an imaging apparatus 2. The imaging apparatus 2 comprises a primary radiation source 4 for irradiating an object 8 to be investigated with a primary radiation 6. The object 8 exemplarily shown in FIG. 1 may be a human being. However, the object 8 may be an animal or any kind of substance. In the embodiment shown in FIG. 1, the primary radiation source 4 is an X-ray source and the primary radiation is X-ray radiation. However, the primary radiation may be any other radiation which is suitable for investigating the object 8.

After passing through the object 8, the primary radiation 6 is detected by a radiation detector device 10. The detector device 10 comprises a scintillator 12 and a photo detector 14. In response to incident primary radiation 6, the scintillator 12 generates a converted primary radiation 18. The photo detector 14 is provided for detecting the converted primary radiation 18 and producing in response hereto image signals representative of the converted primary radiation 18.

In the exemplary embodiment shown in FIG. 1, the scintillator is a CsI:Tl (Thallium doped Caesium Iodide) type scintillator. However, the scintillator can be any scintillator suitable for the selected primary radiation 6. The photo detector 14 employed in the imaging apparatus 2 shown in FIG. 1 is a flat dynamic X-ray detector (FDXD) which comprises a plurality of photodiodes 16 for detecting the converted primary radiation 18 as shown in greater detail in FIG. 2.

The scintillator type CsI:Tl, which is commonly used in flat panel X-ray detectors, exhibits a temporal gain effect, hence forth called "bright-burn". This gain effect depends on the information content of the projection image: Due to trapping of charge carriers, the gain of the scintillator 12 and hence of the detector device 10 may be dependent on the history in time, space and intensity. Upon high irradiation, a gain image is imprinted on the scintillator 12 and is imposed on the images gathered subsequently. In case of low contrast imaging, this image will shine through for longer periods of time (days). In particular in soft tissue imaging, like a CT type of imaging, these imprinted contrasts will show as rings in the reconstructed image. The effects are undesirable, since they reduce low contrast visibility of tissue. As already stated above, an embodiment of the invention deals with annihilation of the effect.

The gain dependence on the applied dose can amount up to 6% from zero exposure up to saturation, depending on the Tl content. In practice, after a digital subtraction angiography (DSA), values of around 1% will be found, which is too high for soft tissue imaging where contrasts of the same order of magnitude must be detected.

In order to enhance the low contrast visibility, the embodiment of a radiation detector device 10 shown in FIG. 1 comprises a secondary radiation source 20 for applying to the scintillator a secondary radiation 22, which is adapted for generating an image of a spatial secondary gain distribution of the scintillator 12 for the secondary radiation 22 wherein the spatial secondary gain distribution image corresponds to a spatial primary gain distribution image of the scintillator 12 for the primary radiation 6, for the X-rays in the present embodiment. Since the secondary radiation source 22 is positioned on a side opposite the X-ray source 4, i.e. on the back of the radiation detector device 10, a detector device 10 of this type is called back lit Flat Dynamic X-ray Detector (FDXD). In particular "back-lit" refers to irradiating the photo-diodes and/or the scintillation layer through the glass substrate supporting these photo-diodes and the scintillation layer.

Figure 2:
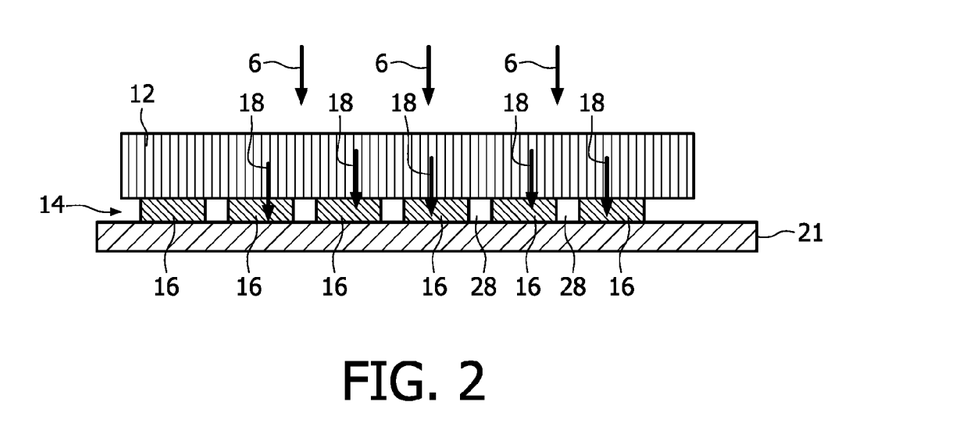
FIG. 2 shows a cross-sectional partial view of an embodiment of a radiation detector device according to the invention.

Experiments have shown that light in the wavelength range between 350 nm and 450 nm or, for example, between 365 nm and 400 nm or, for example, between 370 and 390 nm, or, for example, at 380 nm is suitable for generating a spatial secondary gain distribution image of the CsI:Tl scintillator which corresponds to the spatial primary gain distribution image of the scintillator for the X-ray radiation. In the embodiment of FIG. 1 and FIG. 2, the secondary radiation source 20 is mounted beneath a substrate 21. Over the substrate 21, the photo detector 14 is formed. Over the photo detector 14, the scintillator 12 of the detector device 10 is formed. Accordingly, the secondary radiation source 20 is mounted facing a second surface portion 26 of scintillator 12 which is opposite to a first surface portion 24 of the scintillator 12 facing the primary radiation source 4. Therefore, in the illustrated embodiment, the radiation path of the primary radiation extends between the primary radiation source 4 and the first surface portion 24 and the radiation path of the secondary radiation 22 extends between the secondary radiation source 20 and the second surface portion 26.

It should be noted that the spatial secondary gain distribution image may show an inverted contrast compared to the spatial primary gain distribution image. For example, this is the case for the CsI:Tl scintillator and UV radiation in the specified range between 365 nm and 400 nm. However, even such an inverted spatial secondary gain distribution image may serve for accurate calibration of the radiation detector device 10.

Figure 3:
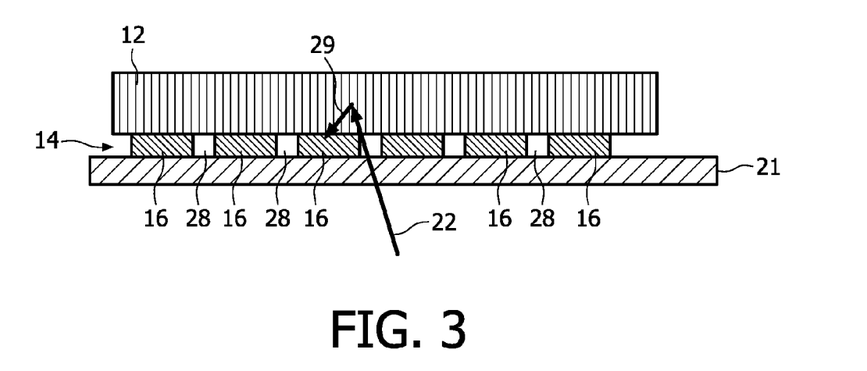
FIG. 3 shows a cross-sectional partial view of another embodiment of a radiation detector device according to the invention.

FIG. 3 shows the elements of FIG. 2 in a different operating state. While FIG. 2 shows the scintillator 12, the photo detector 14 and the substrate 21 during acquiring a primary radiation image, i.e. during irradiation of the scintillator 12 with primary radiation 6, FIG. 3 shows the scintillator 12, the photo detector 14 and the substrate 21 during the generation of a secondary gain contrast image.

FIG. 3 shows an exemplary radiation path of the secondary radiation 22 in the detector device 10 of FIG. 2. The secondary radiation 22 passes through the transparent parts of the substrate 21, passes by the photo diodes 16 and reaches the scintillator 12. Passing secondary radiation 22 through the photo detector 14 may include passing secondary radiation past photo diodes 16 through a space 28 between the photo diodes 16, wherein the space 22 is transparent to the second radiation 22. In the depicted embodiment, the back side of the photo diodes 16 is not transparent to the secondary radiation 22, i.e. to light. Alternatively, the photo diodes 16 may be transparent for the secondary radiation 22.

The secondary radiation 22 reaching the scintillator 12 excites the scintillator 12. The resulting fluorescence 29 of the scintillator 12 is a replica of the trap-induced response of the scintillator on preceding X-ray irradiations of the scintillator 12. This fluorescence 29 forms the spatial secondary gain distribution image of the scintillator 12. The fluorescence 29 is read from the scintillator 12 by the photo detector 14. In the imaging apparatus 2, the read-out fluorescence 29 can be used as a calibration image. In order to allow for an exact calibration of the detector device of this embodiment, the bright-burned flat image made by UV radiation must be a replica of that made by X-rays.

According to an embodiment of the invention, the fluorescence 29 generated by the excited scintillator 12 is used for trap filling of the photo detector 14. In another embodiment, the photo-diodes may also have a direct responsivity to UV light and thus may also be subject to trap-filling. For example, the fluorescence 29 of the excited scintillator can be used for filling traps of the photo diodes 16 in the embodiment of an imaging apparatus 2 shown in FIG. 1, thereby reducing a gain effect, and in particular trap induced gain variations among the photo diodes. The trap filling of the photo diodes 16 can be performed, e.g., in advance to the generation and reading out of the secondary spatial gain distribution image.

FIG. 1 shows an exemplary embodiment of a control unit 30 of an imaging apparatus according to an embodiment of the invention. The imaging apparatus 2 of FIG. 1 is controlled by the control unit 30. The control unit 30 provides control signals 32 to the secondary radiation source 20 for making the secondary radiation source 20 emit the secondary radiation 22.

The control unit 30 further provides control signals 34 to the primary radiation source 4 for making the primary radiation source 4 emit the primary radiation 6.

The control unit 30 further provides control signals 36 to the photo detector 14, e.g. for selecting one or more photo detector elements of the photo detector 14 for read-out.

Further, the control unit 30 receives image signals 38 from the photo detector 14. Image signals may be any signals which relate to an image acquired by the photo detector 14, e.g. image signals representative of an acquired primary radiation image of the object 8, image signals representative of a spatial secondary gain distribution image, image signals representative of a spatial primary gain distribution image, etc.

Further, the control unit 30 may be adapted to control other parts of the imaging apparatus 2. For example in a CT scanner of a C-arc Cardio-Vascular imaging apparatus, the primary radiation source 4 and the radiation detector device 10 are mounted on diametrically opposite sides of a C-shaped arc. As an example, in such an embodiment of a imaging apparatus 2, the control unit 30 may adapted for controlling driving motors of the C-arc (not shown).

The control unit 30 may comprise one or more separate control devices 40 wherein each of the mentioned individual functions of the control unit 30 may be performed by one of the control devices 40. In other embodiments of the invention, the control unit may perform only part of the above mentioned individual functions. In still other embodiments of the invention, the control unit may perform further functions in addition to part or all of the above mentioned individual functions. Some or all of the individual functions of the control unit 30 may be performed in response to a predetermined program. Further, some or all of the individual functions of the control unit 30 may be performed in response to sensor signals or other external signals. Some or all of the individual functions of the control unit 30 may be performed by carrying out an respective computer program on a microprocessor. The control unit 30 or one or more of the control devices 40 of the control unit 30 may be part of a higher ranking control system.

According to an embodiment of the invention, the information about the spatial gain distribution of the scintillator 12 for the primary radiation is generated by irradiating the scintillator 12 with the secondary radiation 22 for generating a spatial secondary gain distribution image of the scintillator for the secondary radiation, wherein the spatial secondary gain distribution image corresponds to an image of the spatial primary gain distribution image of the scintillator 12 for the primary radiation 6. This method, which is referred to as "one step method" in the following, allows for providing information about the spatial gain distribution of the scintillator 12 for the primary radiation, without applying primary radiation to the scintillator 12. The spatial secondary gain distribution image acquired with the one-step method contains the non-uniformity due to the secondary radiation distribution, which however may be acceptable in many applications.

Figure 10:
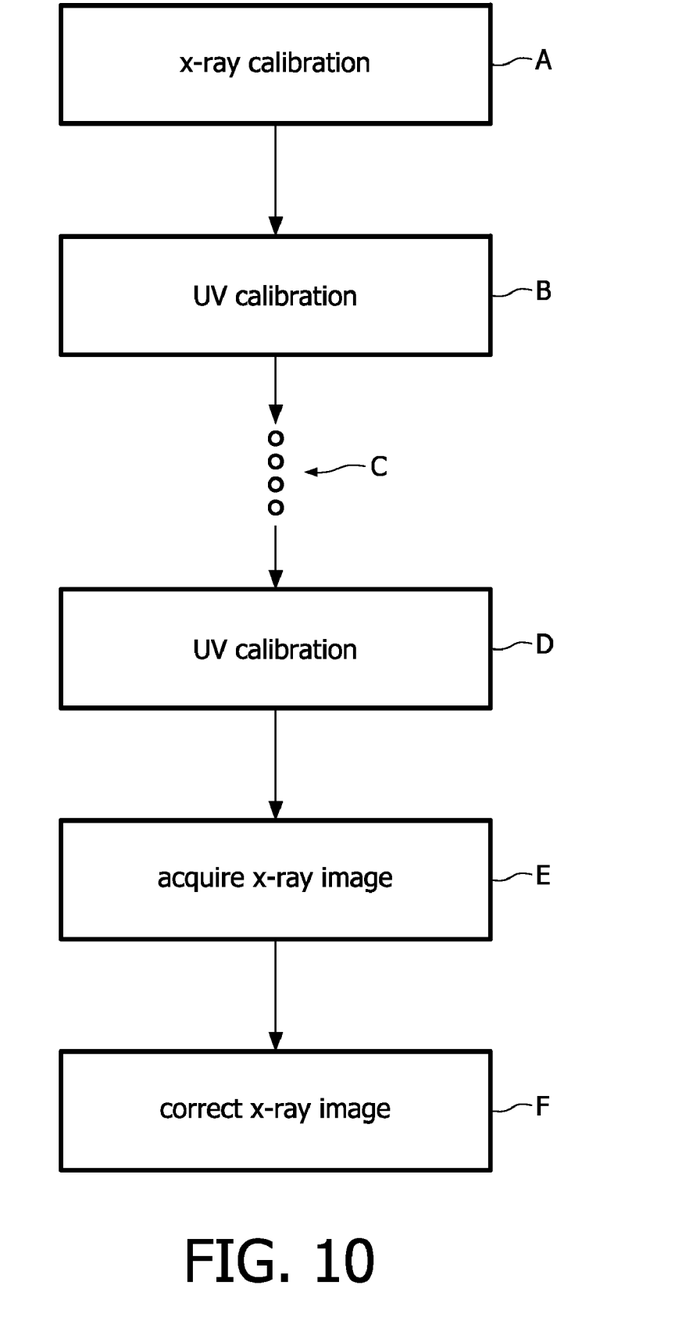
FIG. 10 shows a flow chart of an imaging method according to an embodiment of the invention.

According to another embodiment of the invention, the information about the spatial gain distribution of the scintillator 12 for the primary radiation is obtained by the following steps which are also illustrated in FIG. 10, wherein the specific examples used in the embodiment of FIG. 1 for the primary radiation (X-ray radiation in the embodiment of FIG. 1) and the secondary radiation (UV radiation in the embodiment of FIG. 1) are given in FIG. 10:

1. Calibration of the detector device 10 with primary radiation in an arbitrary manner at t=t0, e.g. by acquiring a primary radiation calibration image. This calibration image is a long term calibration image which can be used for several acquired primary radiation images. Due to the uniform irradiation of the scintillator with primary radiation, no gain contrast is produced in the scintillator (step A in FIG. 10).

2. Irradiating the scintillator 12 with the secondary radiation in a reference scintillator state for generating a reference image of spatial secondary gain distribution at t=t0+dt0 (step B in FIG. 10). The spatial secondary gain distribution reference image is intended for long term use, i.e. for calibration of several primary radiation images. The generation of the reference image of spatial secondary gain distribution can be carried out shortly after t0, i.e. dt0 may be small. The reference scintillator state can be characterized by a uniform gain distribution. For example, the reference scintillator state may be the state of a maiden detector device 10, in particular the state of a maiden scintillator 12. A further example for a reference scintillator state can be characterized by a gain distribution of the scintillator 12 which satisfies a certain condition. Such a condition can be characterised in that the gain contrast of the scintillator 12 in the reference scintillator state is below a predetermined level.

Upon generating a reference image of secondary gain distribution, the scintillator 12 may be subject to various irradiations with primary radiation which change the gain distribution image of the scintillator 12. This is indicated by the dots at C in FIG. 10.

3. Irradiating the scintillator 12 with the secondary radiation 22 in an current, actual scintillator state for generating an actual image of spatial secondary gain distribution at t=t1

(step D in FIG. 10). This step can be performed prior to a Soft Tissue Imaging (STI) run of the imaging apparatus 2 at t=t1+dt1.

4. Generating a true actual image of spatial secondary gain distribution from the reference spatial secondary gain distribution image and the actual spatial secondary gain distribution image (step D in FIG. 10). This step may be performed by dividing the reference spatial secondary gain distribution image and the actual spatial secondary gain distribution image.

Accordingly, this embodiment comprises two irradiation steps with secondary radiation: One irradiation step with secondary radiation in the reference scintillator state before a bright-burn event and a second irradiation step with secondary radiation in the actual scintillator state before an actual primary radiation image is acquired and, after a bright burn event. This two-step method has the advantage that the true actual image of spatial secondary gain distribution contains the bright-burn effects only. In particular, the true actual image of spatial secondary gain distribution is not affected by e.g. a non-uniform irradiation of the scintillator 12 with the secondary radiation 22. The true actual image of spatial secondary gain distribution can be used for calibrating the detector device 10, in particular for calibrating the scintillator 12.

According to an embodiment of the invention, a imaging method of the scintillator 12 comprises the steps:

1. Generating a spatial secondary gain distribution image of the scintillator 12 at t=t1 (steps A to D in FIG. 10). This may be done e.g. by performing the above described one-step method or two-step method. The term "spatial secondary gain distribution image" in this sense includes the "true actual spatial secondary gain distribution image" mentioned above.

2. Acquiring a primary radiation image with the radiation detector device 10 by receiving primary radiation 6 at t=t1+dt1 (step E in FIG. 10). Acquiring a primary radiation image may be for example a Soft Tissue Imaging run of the imaging device 2.

3. Generating a corrected primary radiation image in response to the acquired primary radiation image and the spatial secondary gain distribution image (step F in FIG. 10) at t=t1+dt1+dt2. The step of generating a corrected primary radiation image can be performed by any appropriate method. For example, this step may include inverting the spatial secondary gain distribution image in the case where the spatial secondary gain distribution image shows an inverted contrast compared to a corresponding spatial primary gain distribution image. Further, this step can be performed by a correction method including adding the acquired primary radiation image and the spatial secondary gain distribution image. Further, this step can be performed by a correction method including dividing the acquired primary radiation image and the spatial secondary gain distribution image. A desirable purpose of the correction, according to which the corrected primary radiation image is generated, is the removal of ghost images which are due to bright-burn of the scintillator in the corrected primary radiation image.

The time intervals dt0, dt1 and dt2 depend on the desired timing an on the processing speed of the involved components.

Each of the above mentioned steps may be performed by a respective control device 40 of the control unit 30. In the respective embodiments, the control unit 30 may further comprise a storage device 41 for storing at least the spatial secondary gain distribution reference image and/or the primary radiation calibration image. Storing an image includes storing signals representative of the image.

FIG. 4 to FIG. 8 illustrate some of the possible embodiments of radiation detector devices. Some of these embodiments use a photo-luminescent sheet or a light emitting diode (LED) as a secondary radiation source. A photo-luminescent sheet may comprise an organic luminescence layer of a organic light emitting diode (OLED). However, other forms of secondary radiation sources are also possible in other embodiments of the invention, as long as they provide the appropriate secondary radiation for generating the spatial secondary gain distribution image of the respective scintillator. It is to be understood that in the case where the secondary radiation is UV radiation, the respective photo-luminescent sheet is a UV-luminescent sheet and the respective LED is a UV-LED, which emits radiation in the UV range. In the exemplary embodiments of FIG. 4 to FIG. 8, the photo detector 14 comprises a plurality of photo diodes 16. However, it is to be understood, that the photo detector may have any form suitable for detecting the radiation which is generated by the scintillator in response to the irradiation with the secondary radiation. Each of the embodiments of a radiation detector shown in FIG. 4 to FIG. 8 can replace the radiation detector 10 in FIG. 1. In this sense, features and advantages which have been stated with regard to the radiation detector 10 are not repeated for the embodiments of radiation detectors shown in FIG. 4 to FIG. 8.

When discussing advantages of the embodiments shown in FIG. 4 to FIG. 8, it is assumed that primary radiation 6 is irradiated from above onto the respective radiation detector device. However, this assumption has been made only for illustrative purposes and the embodiments are not restricted hereto.

Figure 4:
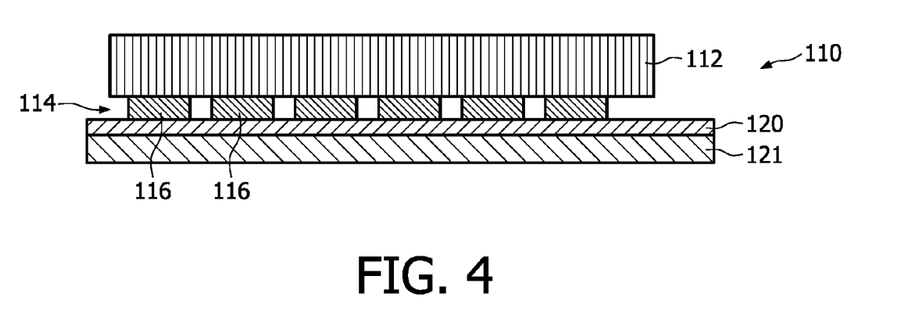
FIG. 4 shows a cross-sectional view of still another embodiment of a radiation detector device according to the invention.

FIG. 4 shows an embodiment of a radiation detector device 110 having a photo-luminescent sheet 120 formed over a substrate 121. Photo diodes 116 of the photo detector 114 are formed over the photo-luminescent sheet 120. Over the photo diodes 116, a scintillator 112 is formed. This embodiment has the advantage that the substrate 121 does not have to be transparent for the secondary radiation.

Figure 5:
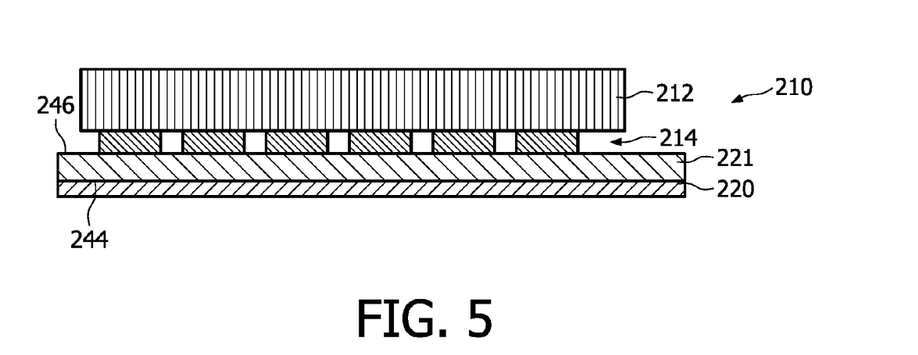
FIG. 5 shows a cross-sectional view of still another embodiment of a radiation detector device according to the invention.

FIG. 5 shows an embodiment of a radiation detector device 210 having a photo-luminescent sheet 220 formed on a surface 244 of a substrate 221. The surface 244 of the substrate 221 is opposite a surface 246, on which the photo detector 214 is formed. A scintillator 212 is formed over the photo detector 214. The substrate 221 can be chosen so as to be transparent for secondary radiation and non-transparent for primary radiation. Instead of such a "filtering substrate", a substrate which is transparent for the primary radiation and the secondary radiation can be provided with an appropriate radiation filter. In both cases, the irradiation of the photo-luminescent sheet 220 with primary radiation can be avoided.

Figure 6:
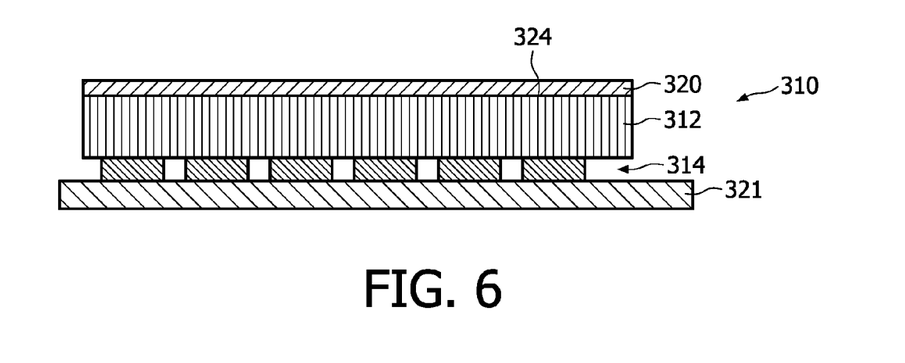
FIG. 6 shows a cross-sectional view of still another embodiment of a radiation detector device according to the invention.

FIG. 6 shows an embodiment of a radiation detector device 310 having a photo detector 314 formed over a substrate 321. Over the photo detector 314 a scintillator 312 is formed. Over the scintillator 312 a photo-luminescent sheet 320 is formed which transparent for primary radiation. The primary radiation 6 and the secondary radiation 22 are therefore irradiated onto a common surface portion 324 of the scintillator 12. This embodiment has the advantage that the radiation path for the radiation which forms the spatial secondary gain distribution image is the comparable to the radiation path of the converted primary radiation which is also detected by the photo detector 314.

Figure 7:
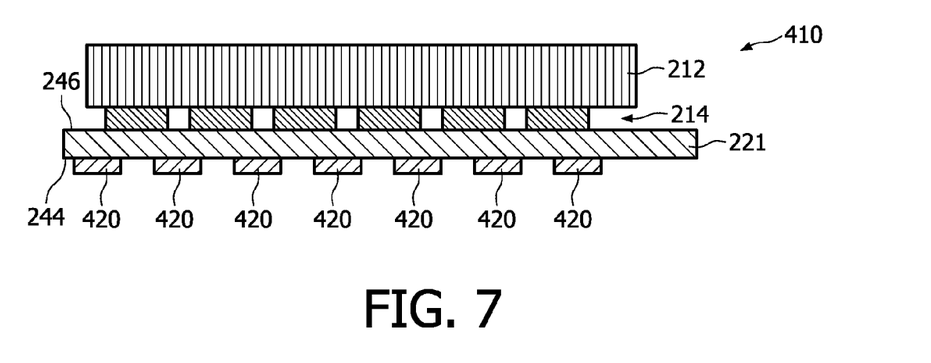
FIG. 7 shows a cross-sectional view of still another embodiment of a radiation detector device according to the invention.

FIG. 7 shows an embodiment of a radiation detector device 410 having the scintillator 212, the photo detector 214 and the substrate 221 of the embodiment of FIG. 5. However, compared to the embodiment of FIG. 5, the radiation detector 410 comprises a plurality of secondary radiation emitting diodes 420 instead of the photo-luminescent sheet 220 of the device 210 of FIG. 5. It should be noted that in any of the embodiments shown in FIG. 4 to FIG. 6 the respective photo-illumination sheet 120, 220, 320 can be replaced by a plurality of appropriate light emitting diodes.

Figure 8:
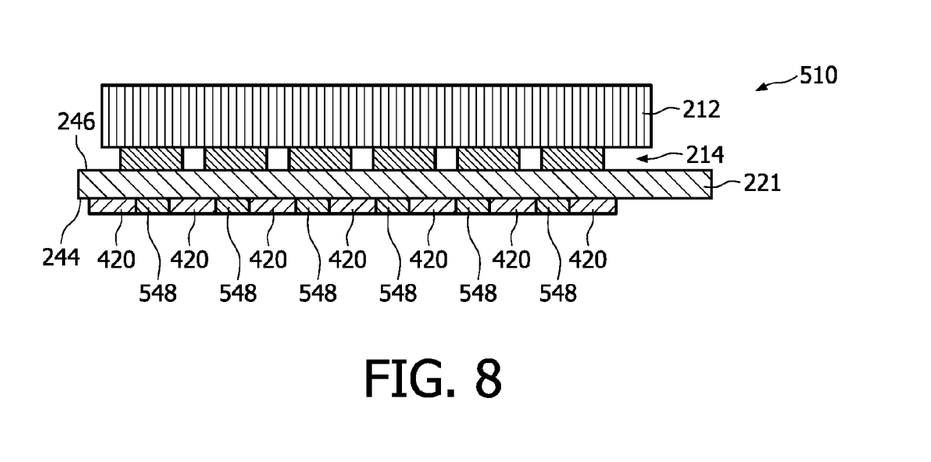
FIG. 8 shows a cross-sectional view of still another embodiment of a radiation detector device according to the invention.

FIG. 8 shows an embodiment of a radiation detector device 510 which corresponds to the radiation detector device 410 of FIG. 7, having in addition a plurality of tertiary radiation sources 548, light emitting diodes in the depicted embodiment, which can be operated to produce tertiary radiation which is suitable for filling traps induced by primary radiation in the photo detector 214. This embodiment has the advantage that after filling the traps in the photo detector 214 with ternary radiation, the photo detector has a uniform sensitivity for reading the spatial secondary gain distribution image.

Figure 9:
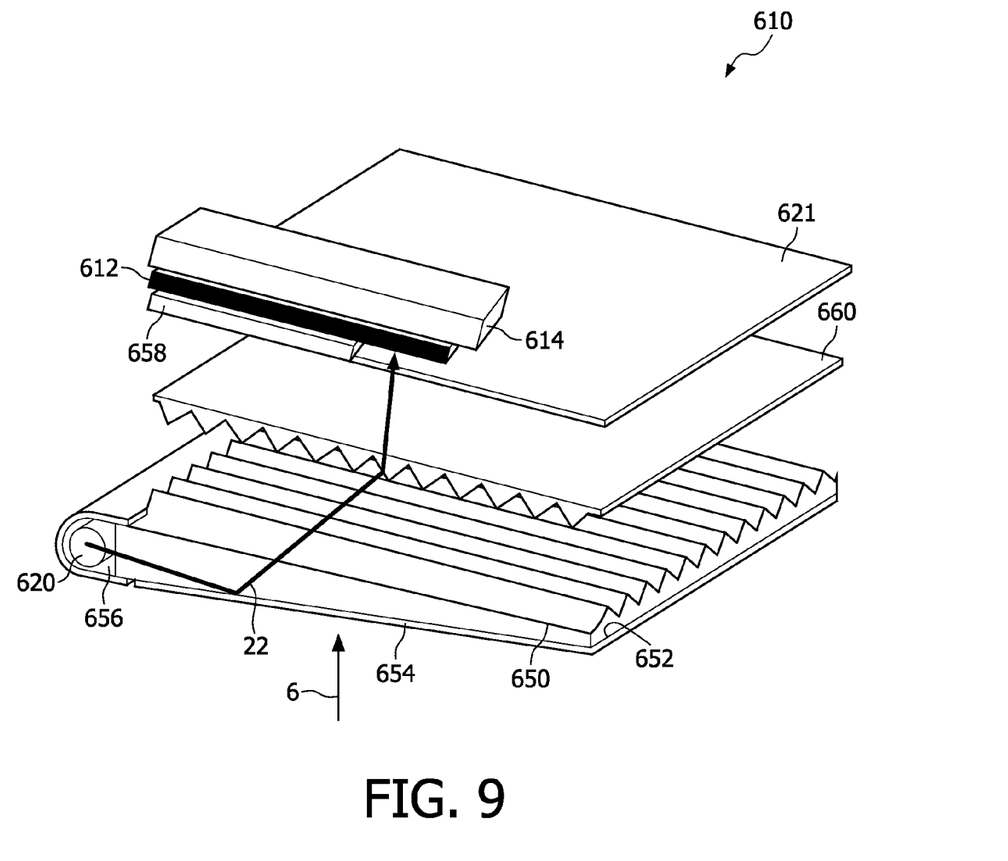
FIG. 9 shows an exploded perspective view of still another embodiment of a radiation detector according to the invention.

FIG. 9 shows an exploded view of a further embodiment of a radiation detector device 610 having a front-lit CMOS type photo detector 614.

The radiation detector device 610 has a LED array as a secondary radiation source 620. The secondary light source 620 is located outside of the beam of primary radiation 6. An advantage of this embodiment is that instead of an LED array 620, any other type of secondary radiation source can be employed in this embodiment, e.g. a secondary light emitting tube, in particular a UV light emitting tube if a CsI type scintillator is used. The primary radiation 6 is irradiated onto the surface of the scintillator 612 that faces substrate 621, i.e. the primary radiation 6 is irradiated from below in FIG. 9.

For guiding secondary light 22 from the LED array 620 to the detector device 610 in order to perform front illumination of the detector device 610, the radiation detector device 610 comprises a light guide 650, e.g. a light guide plate as depicted in FIG. 9, is provided which distributes the secondary light 22 from the secondary light source 620. For example, the light guide plate 650 can be designed to distribute the secondary light 22 across a surface that corresponds to the detector surface of photo detector 614 or to the scintillator surface of scintillator 612. On a surface 652 of the light guide plate 650 which is opposite the detector device 610, a reflection sheet 654 may be provided which is transparent for the primary radiation and which reflects the secondary radiation. Further, a reflector 656 for focusing the secondary light 22 into the light guide plate 650 may be provided.

A substrate 621 is provided which is formed of glass in the embodiment shown in FIG. 9. However, other materials are suitable as long as they are transparent for the primary radiation and the secondary radiation. The substrate 621 carries an optical filter 658 and a scintillator 612, for example a CsI scintillator layer. On top of the scintillator 612, opposite to the substrate 621, the CMOS type photo detector 614 is positioned. The photo detector 614 may be provided in the form of a wafer having a plurality of photo detectors. The wafer may be formed of silicon or any other suitable material. Instead of the described CMOS type radiation detector 614, any other radiation detector may be used. The optical filter is a low pass filter that passes the secondary radiation and the primary radiation and which reflects scintillator emission light. In this way, the responsivity of the scintillator 612 for primary radiation generated photons is increased.

In order to direct the secondary light to the scintillator 612, a radiation director 660, e.g. a face down prism sheet as shown in FIG. 9, can be provided. In the depicted embodiment, the director 660 directs the secondary radiation 22 essentially perpendicular to the scintillator surface. To further homogenize the secondary radiation 22, a diffuser sheet can be provided. For example, an appropriately designed substrate 621 can act as diffuser sheet.

In the embodiment of FIG. 6, the secondary radiation source 620, and the elements in the radiation path of the secondary radiation between the secondary radiation source and the substrate, e.g. the light guide 650 and the director 660, can be replaced by a photo-luminescence sheet. Further, the photo detector 314 in the embodiment shown in FIG. 5 can be a CMOS type photo detector as the photo detector 614 of the embodiment shown in FIG. 9.

While the invention has been illustrated and described in detail in the drawings and foregoing description, such illustration and description are to be considered illustrative or exemplary and not restrictive; the invention is not limited to the disclose embodiments.

For example, the invention is not limited to an X-ray-detector device or to the calibration of an X-ray detector device. Rather, it is possible to use the spatial secondary gain distribution image acquired in accordance with the invention in any application for which information about a gain distribution of a scintillator for a primary radiation is required.

The term "spatial gain distribution image" includes "planar gain distribution image". Indeed, the embodiments shown in the detailed description of the invention are images of a planar gain distribution. However, it is possible to carry out the invention in an embodiment wherein the spatial gain distribution image has other configurations which differ from planar gain distribution images.

Other variations to the discussed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does no indicate that a combination of these measures cannot be used to advantage. A computer program may be stored/distributed on a suitable medium supplied together with or as part of other hardware, but may also be distributed in other forms, such as via the Internet or other wired or wireless telecommunication systems. Any reference signs in the claims should not be construed as limiting the scope.

The invention claimed is:

1. A radiation detector device comprising:
   a primary radiation from a primary radiation source having a first radiation path;
   a secondary radiation from a secondary radiation source having a second radiation path;
   a reflection sheet that is transparent for the primary radiation and which reflects the secondary radiation;
   a light guide plate adjacent and face-to-face with the reflection sheet, the light guide plate comprising an elongated prism sheet to distribute and to change the direction of the secondary radiation;
   a radiation director plate adjacent and face-to-face with the light guide plate, the radiation director plate comprising an elongated prism sheet to distribute and to change the direction of the secondary radiation, wherein the elongated prisms of the light guide plate extend in a direction perpendicular to the direction of the elongated prisms in the radiation director;
   a substrate plate adjacent and face-to-face with the radiation director plate, wherein the first radiation path passes through the reflection sheet, the light guide plate, the radiation director, and the substrate;
   a scintillator adjacent to the substrate for receiving the primary radiation passing through the substrate, wherein the scintillator produces in response to the primary radiation a converted primary radiation having a spatial primary gain distribution image, wherein the radiation director directs the secondary radiation perpendicular to the scintillator surface, wherein the scintillator receives the secondary radiation for generating an image of a spatial secondary gain distribution of the scintillator for the secondary radiation, wherein the spatial secondary gain distribution image corresponds to a spatial primary gain distribution image of the scintillator for the primary radiation;

a photo detector adjacent to the scintillator, wherein the photo detector is provided for reading a converted primary radiation generated by the scintillator in response to the primary radiation and for reading the spatial secondary gain distribution image from the scintillator;

wherein the first radiation path is perpendicular to the scintillator surface, wherein the secondary radiation source is arranged to be outside of the first radiation path and supported by the reflection sheet on the side opposite from the incoming primary radiation, wherein the reflection sheet, the light guide plate, and the radiation director distribute the secondary radiation by multiple reflections and changes of direction across a surface that corresponds to the photo detector surface, and wherein the primary radiation and the secondary radiation are irradiated onto a common surface portion of the scintillator.

2. The device of claim 1, further comprising a read-out unit for reading the secondary spatial gain distribution image from the scintillator.

3. The device of claim 1, further comprising
a control unit for controlling the secondary radiation source in order to irradiate the scintillator with the secondary radiation in a reference scintillator state for generating a reference image of secondary gain distribution, and for controlling the secondary radiation source in order to irradiate the scintillator with the secondary radiation in an actual scintillator state for generating an actual image of secondary gain distribution;

a storage device for storing the spatial secondary gain distribution reference image;

a processing unit for generating true actual image of spatial secondary gain distribution from the spatial secondary gain distribution reference image and said actual spatial secondary gain distribution image.

4. The device of claim 1, wherein the primary radiation is X-ray radiation and the secondary radiation is ultraviolet radiation.

5. An image detection system comprising a radiation detector device according to claim 1.

* * * * *